(12) United States Patent
Zhu et al.

(10) Patent No.: US 9,482,147 B2
(45) Date of Patent: Nov. 1, 2016

(54) METHOD AND APPARATUS TO OPERATE INTERNAL COMBUSTION ENGINE EMPLOYING AN INTAKE AIR COMPRESSOR

(71) Applicant: GM GLOBAL TECHNOLOGY OPERATIONS LLC, Detroit, MI (US)

(72) Inventors: Yongjie Zhu, Troy, MI (US); Yue-Yun Wang, Troy, MI (US); Ibrahim Haskara, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 344 days.

(21) Appl. No.: 13/899,642

(22) Filed: May 22, 2013

(65) Prior Publication Data

US 2014/0345255 A1 Nov. 27, 2014

(51) Int. Cl.
| | |
|---|---|
| *F02D 23/00* | (2006.01) |
| *F02B 33/44* | (2006.01) |
| *F02B 37/22* | (2006.01) |
| *F02B 37/24* | (2006.01) |
| *F02D 41/14* | (2006.01) |
| *F02D 41/00* | (2006.01) |

(52) U.S. Cl.
CPC .............. *F02B 37/22* (2013.01); *F02B 37/24* (2013.01); *F02D 41/0007* (2013.01); *F02D 41/1401* (2013.01); *F02D 41/1445* (2013.01); *F02D 41/1446* (2013.01); *F02D 41/1448* (2013.01); *F02D 41/1489* (2013.01); *F01N 2560/06* (2013.01); *F01N 2560/08* (2013.01); *F02D 2041/1409* (2013.01); *F02D 2041/1418* (2013.01); *F02D 2041/1426* (2013.01); *F02D 2041/1431* (2013.01); *F02D 2200/0402* (2013.01); *F02D 2200/0406* (2013.01); *F02M 26/05* (2016.02); *Y02T 10/144* (2013.01)

(58) Field of Classification Search
CPC .............................. F02B 37/22; Y02T 10/144
USPC ................................ 60/605.1, 611; 123/564
See application file for complete search history.

(56) References Cited

U.S. PATENT DOCUMENTS

| | | | |
|---|---|---|---|
| 4,944,652 | A | 7/1990 | Blotenberg |
| 7,089,738 | B1 | 8/2006 | Boewe et al. |
| 7,360,525 | B2 | 4/2008 | Yamaguchi et al. |
| 7,438,061 | B2 | 10/2008 | Wang et al. |
| 8,087,870 | B2 | 1/2012 | Flucker et al. |
| 2010/0043397 | A1 | 2/2010 | Wang et al. |
| 2010/0083640 | A1 | 4/2010 | Wang et al. |
| 2011/0208409 | A1 | 8/2011 | Snyder et al. |

OTHER PUBLICATIONS

U.S. Appl. No. 13/114,004, Wang, et al.
U.S. Appl. No. 13/113,177, Wang, et al.
U.S. Appl. No. 12/850,112, Haskara, et al.

*Primary Examiner* — Nicholas J Weiss
*Assistant Examiner* — Ngoc T Nguyen (57) ABSTRACT

A method for controlling intake airflow in an internal combustion engine including an intake air compressor includes determining a first compressor boost signal based upon a predetermined intake manifold pressure command, determining a second compressor boost signal based upon a predetermined exhaust pressure limit, determining a compressor boost control command based upon the first compressor boost signal and a limit comprising one of a maximum boost setting and said second compressor boost signal, and controlling the intake air compressor in response to the compressor boost control command.

15 Claims, 3 Drawing Sheets

METHOD AND APPARATUS TO OPERATE INTERNAL COMBUSTION ENGINE EMPLOYING AN INTAKE AIR COMPRESSOR

TECHNICAL FIELD

This disclosure is related to an internal combustion engine employing an intake air compressor.

BACKGROUND

The statements in this section merely provide background information related to the present disclosure. Accordingly, such statements are not intended to constitute an admission of prior art.

Known internal combustion engines may be configured with air compressors that boost intake air to increase engine power over that achievable using natural aspiration. Known air compressors include superchargers and turbochargers. A supercharger is a mechanically-driven device that employs power originating from an engine crankshaft or another source, e.g., an electric motor to drive an intake air compressor. A turbocharger is a turbine-driven device that employs power originating from exhaust gas flow to drive an intake air compressor. Both compression-ignition (CI) engines and spark-ignition (SI) engines can employ air compressors to boost intake airflow.

Employing a turbocharger unit in an engine exhaust system can lead to increased exhaust pressure under some operating conditions, thus potentially affecting engine performance and service life of engine and exhaust components. Engine performance may be related to engine pumping, internal EGR flow, external EGR flow, cylinder scavenging, and other or related performance parameters. Affected engine and exhaust components may include seals in the turbocharger, seals in engine exhaust valves, and other or related components such as downstream exhaust emissions components. Low exhaust pressure may result in insufficient pressure difference across an EGR valve to provide sufficient flow of recirculated exhaust gas into an intake manifold. Excessive exhaust pressure can lead to high exhaust temperature, resulting in overheating of an exhaust valve and a turbine element. Furthermore, excessive exhaust pressure can reduce service life of a turbocharger seal, with accompanying occurrence of oil leakage into the exhaust system.

SUMMARY

A method for controlling intake airflow in an internal combustion engine including an intake air compressor includes determining a first compressor boost signal based upon a predetermined intake manifold pressure command, determining a second compressor boost signal based upon a predetermined exhaust pressure limit, determining a compressor boost control command based upon the first compressor boost signal and a limit comprising one of a maximum boost setting and said second compressor boost signal, and controlling the intake air compressor in response to the compressor boost control command.

BRIEF DESCRIPTION OF THE DRAWINGS

One or more embodiments will now be described, by way of example, with reference to the accompanying drawings, in which.

DETAILED DESCRIPTION

Figure 1:
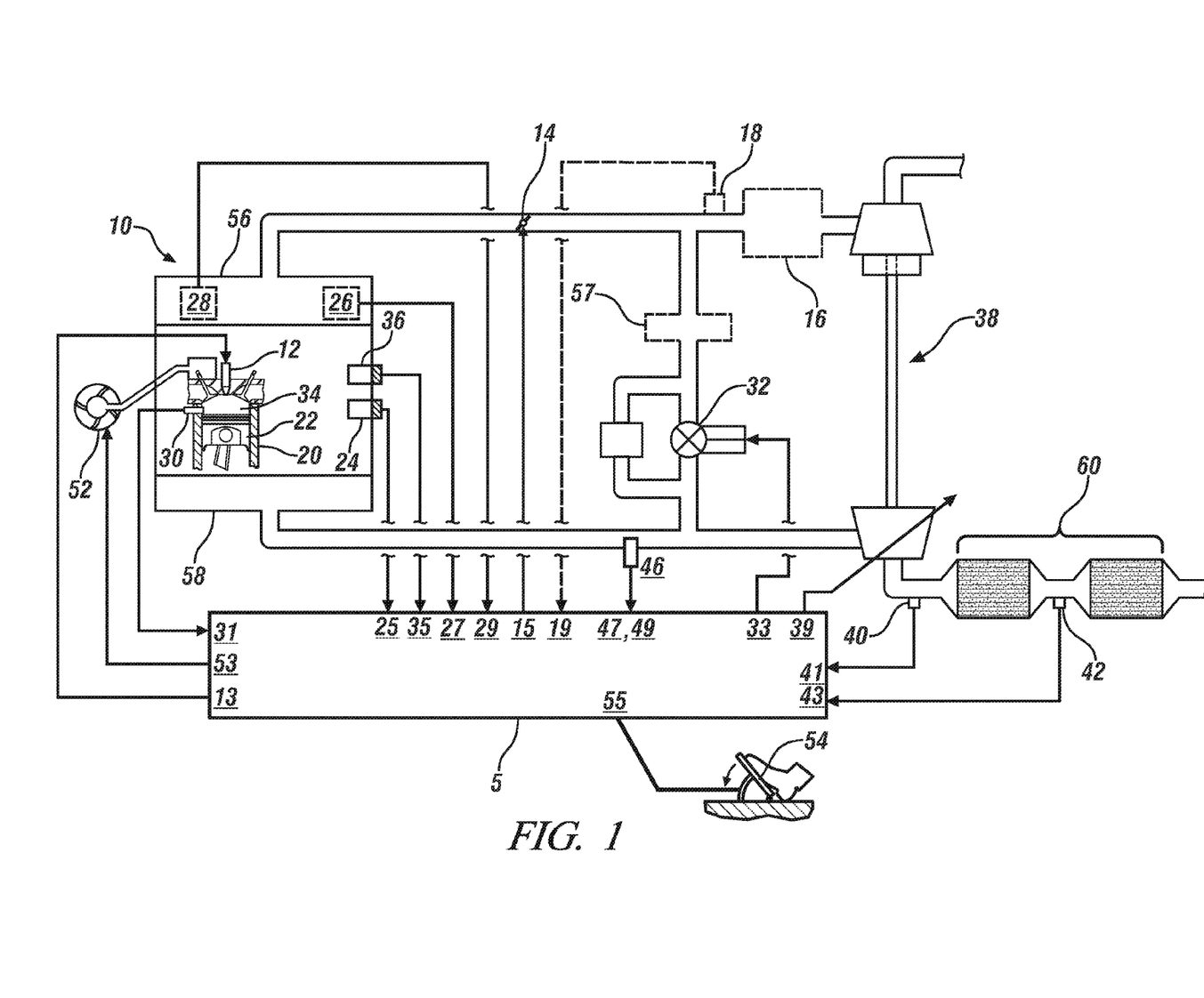
FIG. 1 illustrates an exemplary internal combustion engine, control module, and exhaust aftertreatment system, in accordance with the present disclosure.

Referring now to the drawings, wherein the showings are for the purpose of illustrating certain exemplary embodiments only and not for the purpose of limiting the same, FIG. 1 illustrates an exemplary internal combustion engine (engine) 10, control module 5, and exhaust aftertreatment system 60. The engine 10 can be configured as either a compression-ignition (CI) engine or a spark-ignition (SI) engine. The exemplary engine 10 is a multi-cylinder, direct-injection, internal combustion engine including an intake manifold 56 and an exhaust manifold 58, and having reciprocating pistons 22 attached to a crankshaft and movable in cylinders 20 which define variable volume combustion chambers 34. The crankshaft may be attached to a vehicle transmission and driveline to deliver tractive torque thereto in response to an output torque request. The engine 10 preferably employs a four-stroke operation wherein each engine combustion cycle includes 720° of angular rotation of the crankshaft divided into four 180° stages of reciprocating movement of the piston 22 in the engine cylinder 20. Each variable volume combustion chamber 34 is defined between the piston 34, the cylinder 20, and a cylinder head as the piston 22 translates in the cylinder 20 between top-dead-center and bottom-dead-center points. The cylinder head includes one or more intake valve(s) and exhaust valve(s) for each cylinder 20 and a variable valve activation system 52.

The engine 10 preferably operates in a four-stroke combustion cycle that includes intake, compression, expansion, and exhaust strokes. It is appreciated that the concepts described herein apply to other combustion cycles. The exhaust aftertreatment system 60 fluidly couples to the exhaust manifold 58, and preferably includes catalytic and non-catalyzed elements configured to purify exhaust gas constituents using oxidation, reduction, filtering, and other purification methods. The disclosure is applicable to powertrain systems that employ internal combustion engines in combination with transmission devices to generate tractive torque, including by way of example engine-transmission systems and hybrid powertrain systems employing non-combustion torque generative motors.

The engine 10 includes sensors to monitor engine operation and actuators to control engine operation. The sensors and actuators are signally and operatively connected to control module 5. Output and control signals associated with the sensors and actuators are collectively referred to herein as engine operating parameters. The actuators are installed on the engine 10 and controlled by the control module 5 in response to operator inputs to achieve various performance goals. In one embodiment, a fuel injection system including a plurality of direct-injection fuel injectors 12 is fluidly coupled either directly or via a common-rail fuel distribution system to a pressurized fuel distribution system including a high-pressure fuel pump. The fuel injectors 12 directly inject fuel into each of the combustion chambers 34 to form a cylinder charge in response to an injector control signal 13 from the control module 5. The injector control signal 13 is generated in response to the output torque request, and correlates to an amount of fuel to deliver to the combustion chamber 34. The fuel injectors 12 are individually supplied with pressurized fuel, and have operating parameters including a minimum pulsewidth and an associated minimum controllable fuel flow rate, and a maximum fuel flow rate. An exhaust gas recirculation (EGR) system includes a flow channel for directing flow of externally recirculated exhaust gas between the exhaust manifold 58 and the intake manifold 56, an intercooler 57 and an EGR valve 32 that is controlled via control signal 33 from the control module 5. An intake air compressor 38 is configured to control flow of intake air to the engine 10 in response to a compressor boost control command 39. The intake air compressor 38 boosts a supply of intake air into the engine 10 to increase engine mass airflow and thus increase engine power, including increasing intake air pressure to greater than ambient pressure. In one embodiment the intake air compressor 38 is a variable-geometry turbocharger (VGT) that includes a turbine located in the exhaust gas feedstream rotatably coupled to a compressor that is configured to increase flow of engine intake air, with the magnitude of increase in flow of engine intake air controllable in response to the compressor boost control command 39. Alternatively, the intake air compressor 38 may include a supercharger device or another turbocharger device. Alternatively, the VGT can be replaced by a waste gate system, the VGT position can be replaced by waste gate position, and the exhaust flow can be replaced by exhaust flow that bypasses the waste gate.

An air intercooler device 16 may be fluidly located between the intake air compressor 38 and the engine intake manifold 56. An electronically-controlled throttle valve 14 controls throttle opening and thus flow of intake air into the intake system of the engine 10 in response to a throttle control signal (ETC) 15. A glow-plug may be installed in each of the combustion chambers 34 for increasing in-cylinder temperature during engine starting events at cold ambient temperatures.

The engine 10 may be equipped with a controllable valvetrain 52 configured to adjust openings and closings of one or both the intake and exhaust valves of each of the cylinders in response to a control signal 53, including any one or more of valve timing, phasing (i.e., timing relative to crank angle and piston position), and magnitude of lift of valve openings.

The sensors described herein are configured to monitor physical characteristics and generate signals that correlate to engine, exhaust gas, and ambient parameters. A crank sensor 24 interacts with a multi-tooth target wheel attached to the crankshaft to monitor engine crank position and engine speed (RPM) 25. A combustion pressure sensor 30 is configured to monitor cylinder pressure 31, from which a mean-effective pressure or another suitable combustion parameter may be determined. The combustion pressure sensor 30 may be non-intrusive, including a force transducer having an annular cross-section that is installed into the cylinder head at an opening for a glow-plug and having an output signal that is proportional to cylinder pressure. The pressure sensor 30 includes a piezo-ceramic or other suitable monitoring device. A mass air flow (MAF) sensor 18 monitors mass air flow 19 of fresh intake air. A coolant sensor 36 monitors engine coolant temperature 35. A manifold absolute pressure (MAP) sensor 26 monitors intake manifold absolute pressure 27 and ambient barometric pressure. A manifold air temperature (MAT) sensor 28 monitors intake manifold air temperature 29. In one embodiment, an exhaust sensor 46 is employed to monitor exhaust gas pressure 47 and exhaust gas temperature 49 upstream of the intake air compressor 38. Alternatively, the exhaust gas pressure 47 and exhaust gas temperature 49 upstream of the intake air compressor 38 can be estimated based upon engine and ambient conditions. One exemplary method and system for estimating exhaust gas pressure 47 and exhaust gas temperature 49 upstream of the intake air compressor 38 is described in U.S. Pat. No. 7,438,061 B2, the entirety of which is incorporated herein by reference.

Exhaust gas sensors 40 and 42 are employed to monitor engine-out exhaust gases 41 and post-purification exhaust gases 43, respectively, to determine one or more exhaust gas parameters, e.g., air/fuel ratio and exhaust gas constituents, and may be used as feedback for control and diagnostics. Other sensors and monitoring schemes may be employed for purposes of control and diagnostics. Operator input in the form of an output torque request 55 may be obtained through an operator interface system 54 that preferably includes an accelerator pedal and a brake pedal, among other devices. Each of the aforementioned sensors is signally connected to the control module 5 to provide signal information which is transformed to information representative of the respective monitored parameter. It is understood that this configuration is illustrative, not restrictive, including the various sensors being replaceable with functionally equivalent devices and routines.

The control module 5 executes routines stored therein to control the aforementioned actuators to control engine operation, including throttle position, fuel injection mass and timing, EGR valve position to control flow of recirculated exhaust gases, compressor boost, glow-plug operation, and control of intake and/or exhaust valve timing, phasing, and lift on systems so equipped. The control module 5 is configured to receive the operator inputs (e.g., a throttle pedal position and a brake pedal position) to determine the output torque request 55 and receive signal inputs from the sensors indicating engine operation and ambient conditions. The engine 10 is configured to generate output torque in response to the output torque request 55, including operating over a broad range of temperatures, cylinder charge (air, fuel, and EGR) and injection events. Operation of the engine 10 is described at an operating point, which is characterized in terms of engine speed (RPM) and engine load. The engine load is indicated by the injector control signal 13 in response to the output torque request.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other suitable components to provide the described functionality. Software, firmware, programs, instructions, routines, code, algorithms and similar terms mean any instruction sets including calibrations and look-up tables. The control module 5 has a set of control routines executed to provide the desired functions. The routines are preferably executed during preset loop cycles. Routines are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, routines may be executed in response to occurrence of an event.

A method for operating an embodiment of the internal combustion engine 10 described with reference to FIG. 1 includes employing a boost pressure control function including a first inverse VGT model to determine a VGT control parameter responsive to intake manifold pressure. A concurrently executing exhaust pressure control function, including a second inverse VGT model, is employed to determine a VGT control parameter responsive to exhaust pressure.

Figure 2:
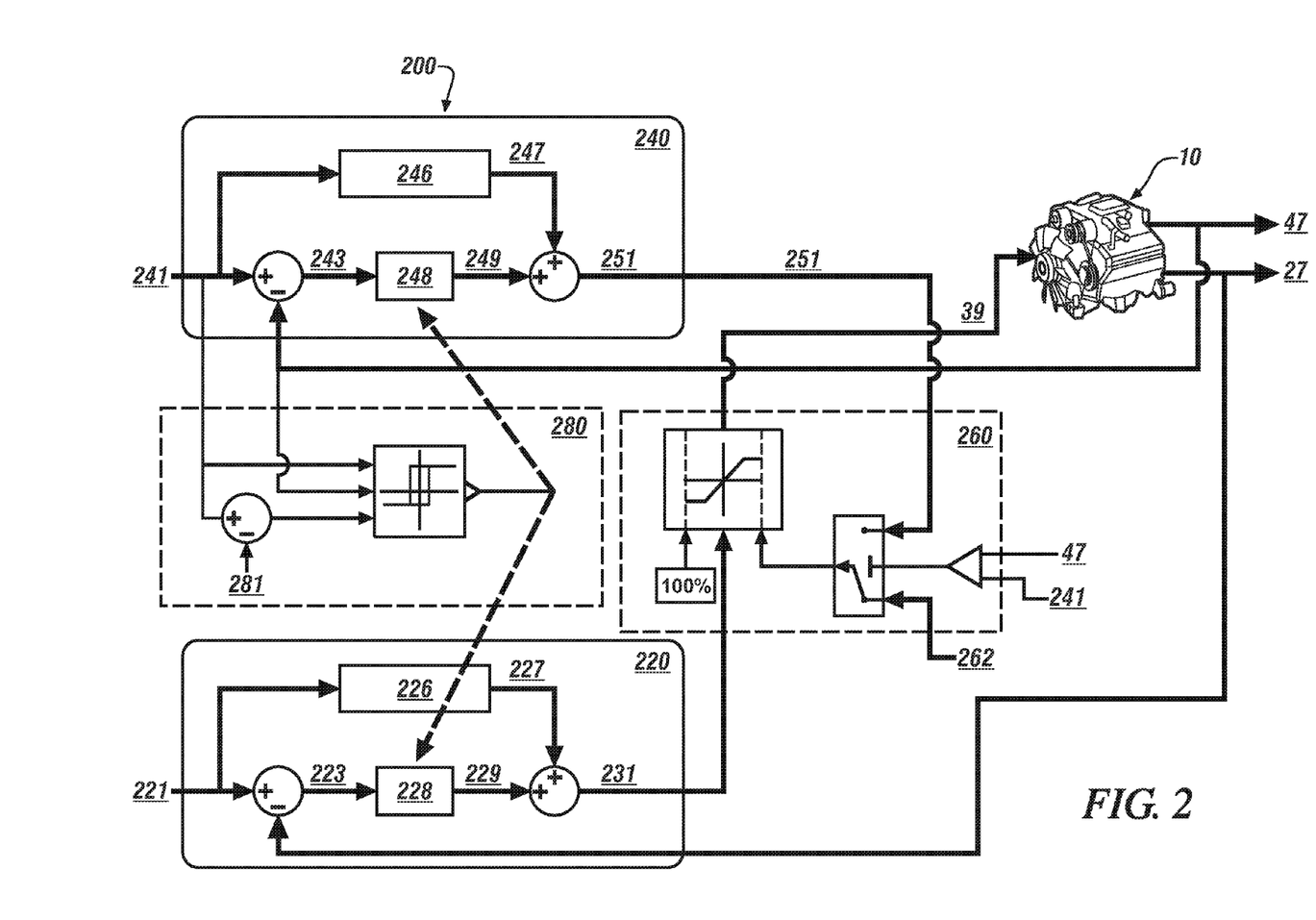
FIG. 2 illustrates a compressor boost control scheme that can be employed to control an embodiment of the internal combustion engine of FIG. 1, in accordance with the disclosure.

FIG. 2 schematically shows a compressor boost control scheme 200 for controlling intake pressure at internal combustion engine 10 of FIG. 1. The compressor boost control scheme 200 is configured to determine the compressor boost control command 39 for the intake air compressor 38 based upon the intake manifold absolute pressure 27 and the exhaust gas pressure 47 upstream of the intake air compressor 38. In one embodiment the compressor boost control is accomplished through VGT position control. Therefore, further reference to compressor boost control command 39 will be with respect to a VGT position command 39. The compressor boost control scheme 200 employs a control architecture including a boost pressure control function 220 operating in parallel with an exhaust pressure control function 240 in determining the VGT position command 39.

The boost pressure control function 220 provides an intake pressure-based compressor boost signal 231. The boost pressure control function 220 responds to a predetermined intake manifold pressure command 221 and employs a first inverse VGT model 226 in a feed-forward operation to determine an intake pressure-based compressor boost signal 231. An exemplary inverse VGT model 226 is disclosed in co-pending U.S. Ser. No. 13/762,549, the contents of which are incorporated herein by reference. Preferably, the boost pressure control function 220 also includes a feedback loop. The first inverse VGT model 226 is employed in a feed-forward operation to determine a modeled intake pressure-based compressor boost signal 227 in response to the intake manifold pressure command 221. The feedback loop calculates a difference between the intake manifold pressure command 221 and the intake manifold absolute pressure 27 to determine an intake manifold pressure deviation 223 that is provided as input to PID controller 228 which yields an intake-based compressor boost signal correction 229. The intake-based compressor boost signal correction 229 is added to the modeled intake pressure-based compressor boost signal 227 to determine the intake pressure-based compressor boost signal 231. In one embodiment, the modeled intake pressure-based compressor boost signal 227, the intake-based compressor boost signal correction 229, and the intake pressure-based compressor boost signal 231 are in the form of a VGT position control. Therefore, further reference to compressor boost signals of boost pressure control function 220 will be with respect to VGT position.

Figure 3:
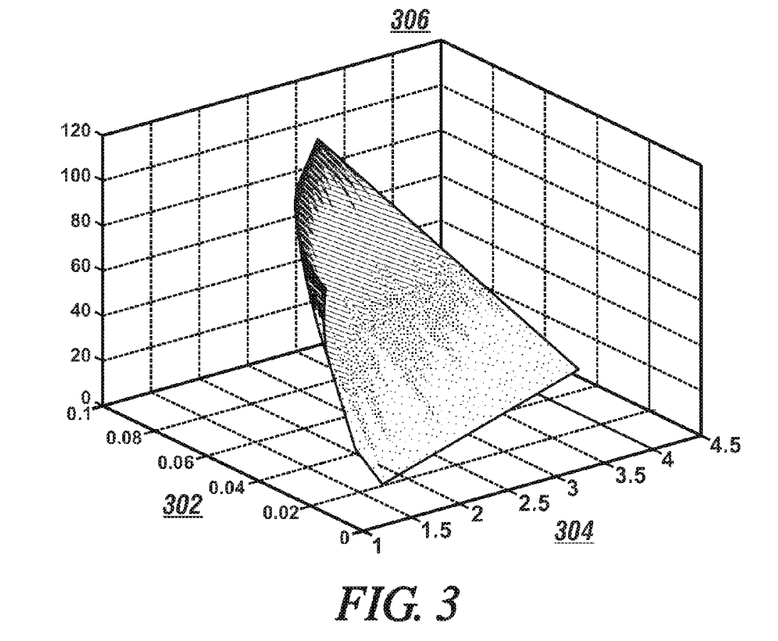
FIG. 3 illustrates a multi-dimensional calibration map providing a VGT position map that covers a range of pressure ratios and a sweep of VGT positions that permits the VGT inverse model to work under all engine operating conditions, in accordance with the disclosure.

The first inverse VGT model 226 preferably provides a intake pressure-based feed-forward VGT position signal 227 by converting the intake manifold pressure command 221 to an exhaust mass flowrate term $\dot{m}_{ex}$ employing EQ. 6, and employing the exhaust mass flowrate term $\dot{m}_{ex}$ and a pressure ratio across the turbine of the VGT to determine the intake pressure-based feed-forward VGT position signal 227 using a predefined calibration map, e.g., as shown with reference to FIG. 3, wherein the predefined calibration map is developed employing one of the models described with reference to either EQ. 3 or EQ. 5. Error or noise may be introduced into the feed-forward operation of the closed-loop system, for example through un-modeled dynamics, inaccuracies in inputs and estimated parameters, or engine-to-engine differences. Therefore, the PID controller 228 provides feedback control that is employed to improve tracking performance based upon the intake manifold pressure deviation 223.

The exhaust pressure control function 240 responds to a predetermined exhaust pressure limit 241 and employs a second inverse VGT model 246 in a feed-forward operation to determine a limit-based compressor boost signal 251. Preferably, the exhaust pressure control function 240 also includes a feedback loop. The second inverse VGT model 246 is employed in a feed-forward operation to determine a modeled limit-based compressor boost signal 247 in response to the exhaust pressure limit 241. The feedback loop calculates a difference between the exhaust pressure limit 241 and the exhaust gas pressure 47 to determine an exhaust pressure deviation 243 that is provided as input to PID controller 248 which yields a limit-based compressor boost signal correction 249. The limit-based compressor boost signal correction 249 is added to the modeled limit-based compressor boost signal 247 to determine the limit-based compressor boost signal 251. In one embodiment, the modeled limit-based compressor boost signal 247, the limit-based compressor boost signal correction 249, and the limit-based compressor boost signal 251 are in the form of a VGT position control. Therefore, further reference to the compressor boost signals of exhaust pressure control function 240 will be with respect to VGT position.

The second inverse VGT model 246 preferably provides a limit-based feed-forward VGT position signal 247 by employing the exhaust pressure limit 241 to determine the exhaust mass flowrate term $\dot{m}_{ex}$ employing EQ. 6, and employing the exhaust mass flowrate term $\dot{m}_{ex}$ and the pressure ratio across the turbine of the VGT to determine the limit-based feed-forward VGT position signal 247 using a predefined calibration map, e.g., as shown with reference to FIG. 3, wherein the predefined calibration map is developed employing one of the models described with reference to either EQ. 3 or EQ. 5. The PID controller 248 provides feedback control that is employed to improve tracking performance based upon the exhaust pressure deviation 243.

A debounce operation 280 is employed to limit switching between the boost pressure control function 220 and the exhaust pressure control function 240 when the exhaust gas pressure 47 is operating near the exhaust pressure limit 241. The exhaust pressure limit 241 is preferably preset as a maximum value—in one embodiment it is set to 140 kPa—and provides an upper hysteretic limit. The exhaust pressure limit 241 alternatively may be dynamically selected, and based upon limiting turbine speed to a maximum speed, limiting a compressor outlet temperature to a maximum temperature, and inducing control to prevent or mitigate a pressure surge. A lower hysteretic limit is provided as the difference between the exhaust pressure limit 241 and a predetermined offset 281.

A saturation selection operation 260 is employed to control switching of saturation boundaries in determining the VGT position command 39 when the system is operating near the exhaust pressure limit 241. The saturation selection operation 260 selects one of a minimum VGT position signal 262 (maximum boost setting) and the limit-based VGT position signal 251 in determining the VGT position command 39 depending upon the magnitude of the exhaust gas pressure 47 in comparison with the exhaust pressure limit 241. When the exhaust gas pressure 47 is less than the exhaust pressure limit 241, the VGT position command 39 is determined based upon the intake pressure-based VGT position signal 231 from boost pressure control function 220 as may be limited between the minimum VGT position signal 262 and a maximum VGT position of 100% (minimum boost setting). When the exhaust gas pressure 47 is not less than the exhaust pressure limit 241, the VGT position command 39 is determined based upon the intake pressure-based VGT position signal 231 boost pressure control function 220 as may be limited between the limit-based VGT position signal 251 and the maximum VGT position of 100%.

The boost pressure control function 220 and the exhaust pressure control function 240 execute in parallel. When exhaust pressure is less than the exhaust pressure limit 241, the PID controller 248 in the exhaust pressure control function 240 is suspended with the limit-based compressor boost signal correction 249 reset to zero, and the PID controller 228 in the boost pressure control function 220 is fully operational. The intake pressure-based VGT position signal 231 from boost pressure control function 220 is now subjected to the saturation boundary of the minimum VGT position signal 262 in determining the VGT position command 39. When the exhaust pressure is not less than the exhaust pressure limit, the PID controller 228 for the boost pressure control function 220 stops integrating, and the PID controller 248 in the exhaust pressure control function 240 is fully operational. The intake pressure-based VGT position signal 231 from boost pressure control function 220 is now subjected to the saturation boundary of the limit-based VGT position signal 251 generated from the exhaust pressure control function 240 in determining the VGT position command 39. In such a way, a smooth transition between the exhaust pressure control function 240 and the boost pressure control function 220 is achieved.

The compressor boost control scheme 200 serves to prevent the engine from excessive peak cylinder pressure by limiting exhaust pressure and maintain integrity of lubricating and cooling seals in the turbine of the VGT, which has the secondary effect of protecting downstream catalytic converter element(s) from oil-induced poisoning. Furthermore, vehicle calibration work at varying environment operating conditions may be reduced or eliminated. Furthermore, exhaust pressure control undershoot or overshoot is minimized as a result of compensating for transport delays during transient operations.

An inverse VGT model is preferably developed based upon an analytical model as follows, wherein the turbine of the VGT is considered as a nozzle and employing equations for steady-state compressible flow, the equations describing mass flowrate through a flow resistance $\dot{m}_{ex}$ can be given in the following form:

$$\dot{m}_{ex} = C_d A \frac{P_{ex}}{\sqrt{RT_{ex}}} \cdot f_1(P_r, m) \quad [1]$$

wherein $C_d$ is a discharge coefficient of the valve,

A is an actual flow area, $C_d A$ can be denoted by $\Omega(VGT, P_r)$, and depends upon the VGT valve position and a pressure ratio across the turbine, $P_{ex}$ is exhaust gas pressure, $T_{ex}$ is exhaust gas temperature, R is ideal gas constant, $$P_r = \frac{P_{st}}{P_{ex}}$$

is the pressure ratio across the turbine, $P_{st}$ is a turbine outlet pressure, and $$f_1 = \begin{cases} \sqrt{\frac{2\gamma}{\gamma-1}\left(P_r^{\frac{2}{m}} - P_r^{\frac{m+1}{m}}\right)} & PR_c < P_{st}(\text{subsonic}) \\ \left(\frac{2}{m+1}\right)^{\frac{1}{(m-1)}} \sqrt{\frac{2\gamma}{\gamma-1}\frac{m-1}{m+1}} & P_{st} \leq PR_c(\text{choked}), m = f(VGT) \end{cases}$$

wherein $\gamma$ is a specific heat ratio of the gas, $$PR_c = P_{ex}\left(\frac{2}{\gamma+1}\right)^{\frac{\gamma}{\gamma-1}},$$

and is a critical pressure ratio, m is a parameter which is a function of VGT valve position; and VGT is the VGT valve position, i.e., a commanded open position.

A first inverse VGT model is derived using the following relationship.

$$\frac{\dot{m}_{ex}\sqrt{RT_{ex}}}{P_{ex}} = \Omega(VGT, P_r) \cdot f_1(P_r, m) = F(P_r, VGT) \quad [2]$$

The relationship in EQ. 2 above yields a unique convex mapping, i.e. for a given VGT position and a pressure ratio, a unique corrected exhaust flow can be determined. Therefore, its inverse model has a unique solution that can be defined in terms of employing a corrected exhaust flow, e.g., exhaust mass flowrate term $\dot{m}_{ex}$ and the pressure ratio $P_r$ to determine a VGT position, in accordance with the following relationship.

$$VGT = F^{-1}\left(P_r, \frac{\dot{m}_{ex}\sqrt{RT_{ex}}}{P_{ex}}\right) \quad [3]$$

The relationship in EQ. 2 can be approximated to include a simple orifice wherein m becomes a constant, and $f_1(P_r, m) = f_1(P_r)$ as set forth in EQ. 4.

$$\frac{\dot{m}_{ex}\sqrt{RT_{ex}}}{P_{ex}f_1(P_r)} \approx \Omega(VGT, P_r) \quad [4]$$

The relationship in EQ. 4 can be approximately inverted to yield a second inverse VGT model in accordance with the following relationship.

$$VGT = \Omega^{-1}\left(P_r, \frac{\dot{m}_{ex}\sqrt{RT_{ex}}}{P_{ex}f_1(P_r)}\right) \quad [5]$$

Operation of an internal combustion engine including a VGT system introduces several potentially disparate elements that introduce transport lags and dynamic system delays that affect the exhaust mass flowrate term $\dot{m}_{ex}$. The disparate elements include transport delays from fresh air intake to engine intake valves and combustion process delays, and differences between mass air flow transport and fueling transport. Two types of dynamic system delays are explicitly considered. It is appreciated that not all signals are measured at the exact location of their definition in engine models and inverse VGT models. For example, the inverse VGT model uses exhaust flow as one input, which is calculated as the sum of fresh mass air flow and fuel flow. However, the fresh air flow is measured by the MAF sensor at the compressor inlet, and travels to the turbine inlet through charge air cooler, intake manifold, cylinder combustion and exhaust manifold. This can be described as an air flow transportation delay $\tau_1$, which includes the time for the air flow to travel from where fresh air flow sensor is located to engine intake valves. Combustion process delay $\tau_2$ represents a time duration the mixture of fuel and air spend in the engine cylinders before the burned gas reaches an inlet to the VGT. The sum, $\tau_1+\tau_2$ is the mass air flow delay to turbine inlet. The air flow transportation delay $\tau_1$ and the combustion process delay $\tau_2$ are determined based upon engine operating conditions.

Thus the exhaust mass flowrate term $\dot{m}_{ex}$ can be estimated using a dynamic transport delay compensation in accordance with the following relationship.

$$\dot{m}_{ex} = \frac{1-\tau_2 s}{1+\tau_2 s}\dot{m}_f + \frac{1-(\tau_1+\tau_2)s}{1+(\tau_1+\tau_2)s}\dot{m}_a \quad [6]$$

wherein $\tau_1$ is air flow transportation delay,
$\tau_2$ is combustion process delay,
$\tau_1+\tau_2$ is mass airflow delay to turbine inlet,
$\dot{m}_f$ is mass fuel flow,
$\dot{m}_a$ is mass air flow, $$\dot{m}_a = A \cdot v \cdot \rho,$$

$$v = \frac{\dot{m}_a}{A\rho},$$

$$d = \int_0^{\tau_1} v\, dt = \int_0^{\tau_1} \frac{\dot{m}_a}{A\rho} dt = \frac{\dot{m}_a(\text{avg})}{A\rho(\text{avg})}\tau_1,$$

$$\tau_1 = \frac{d \cdot A \cdot P_m(\text{avg})}{\dot{m}_a(\text{avg}) \cdot R \cdot T_m(\text{avg})},$$

$\dot{m}_a$ is mass air flow,
$P_m$ is intake manifold pressure,
$T_m$ is intake manifold temperature,
d is distance from MAF sensor to engine inlet,
A is mean cross section area of the pipe, and $$\tau_2 = \frac{120}{Nn}\alpha$$

wherein N is engine speed,
n is the number of cylinders, and
α depends on intake to exhaust stroke duration for air and injection timing to exhaust stroke duration for fuel.

In this manner, the exhaust mass flowrate term $\dot{m}_{ex}$ can be accurately estimated based upon mass fuel flow $\dot{m}_f$ and mass air flow $\dot{m}_a$, or alternatively, by employing a dynamic delay compensation.

FIG. 3 shows a multi-dimensional calibration map providing a VGT position map that covers a full range of pressure ratios and a full sweep of VGT positions that permits the VGT inverse model to work effectively under all engine operating conditions. The calibration map includes VGT position 306 that can be determined based upon the dynamic delay-compensated exhaust mass flowrate term $\dot{m}_{ex}$ 302 and pressure ratio 304. The calibration map can be developed in an off-line environment for an embodiment of the engine 10 of FIG. 1 and can executed in one of the controllers as a multi-dimensional lookup table, a series of executable equations, or another suitable form to preclude having to code, calibrate and execute one of the models described herein.

The feedforward control is employed to determine an expected VGT position in response to a desired exhaust pressure or a desired intake manifold pressure. After the VGT inverse model is built, a steady state data set can be employed to validate accuracy of an embodiment of a VGT inverse model, with inputs including turbine out pressure, exhaust pressure, exhaust temperature and exhaust mass flow passing through the VGT. The output is the VGT open position. Simulation results indicate that the predicted VGT open position determined using the VGT inverse model closely match measured VGT operation position.

Figure 4:
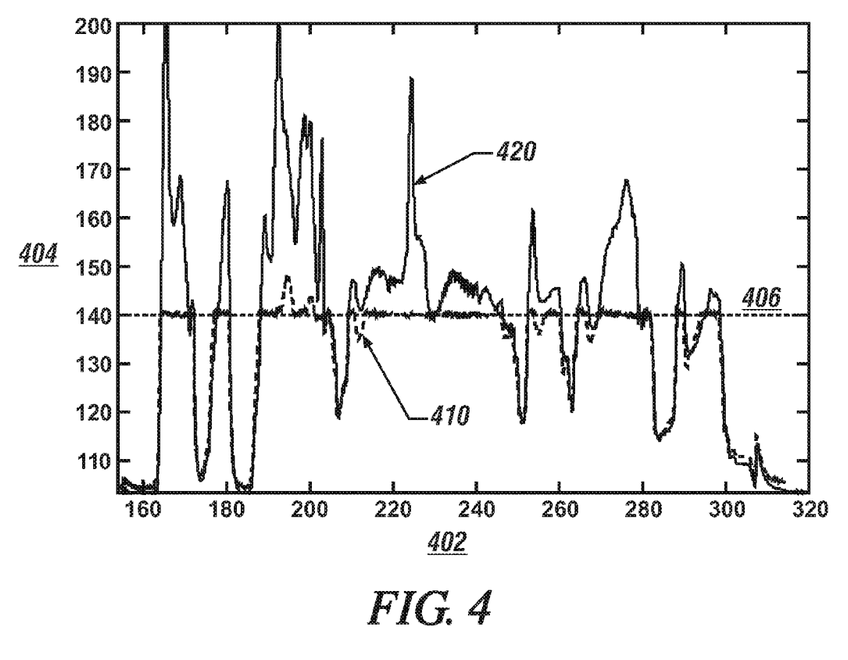
FIG. 4 illustrates engine exhaust pressure in relation to time, and includes simulated operation of an embodiment of an engine of FIG. 1 over a predetermined speed/load cycle, in accordance with the disclosure.

FIG. 4 graphically shows engine exhaust pressure on the horizontal axis 404 in relation to time on the horizontal axis 402, and includes simulated operation of an embodiment of an engine employing a VGT system described with reference to FIGS. 1 and 2 over a predetermined speed/load cycle. Line 410 depicts operation of the engine employing an embodiment of the compressor boost control scheme 200 with the exhaust pressure limit set at 140 kPa. Line 420 depicts operation of the engine over the same predetermined speed/load cycle without benefit of the compressor boost control scheme 200. The operation of the engine employing an embodiment of the compressor boost control scheme 200 with the exhaust pressure limit 406 set at 140 kPa is able to maintain the exhaust pressure at a maximum exhaust pressure of 140 kPa. At specific periods during operation, the compressor boost control scheme 200 is unable to maintain the exhaust pressure at the 140 kPa limit due to the VGT valve being fully open and thus unable to provide further adjustment to the exhaust pressure. It is appreciated that the exhaust pressure limit 406 of 140 kPa is meant to be illustrative and not restrictive, and may be set at any suitable pressure limit that correlates to the intended objective of the compressor boost control scheme 200 including maintaining physical integrity of elements of the VGT.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling intake airflow in an internal combustion engine including an intake air compressor, comprising,
within a control module;
determining a first compressor boost signal based upon a predetermined intake manifold pressure command;
determining a second compressor boost signal based upon a predetermined exhaust pressure limit;
determining a compressor boost control command based upon the first compressor boost signal and a compressor boost limit comprising one of a maximum boost setting and said second compressor boost signal;
controlling the intake air compressor to operate at a position that controls flow of intake air to the internal combustion engine in response to the compressor boost control command; and
operating the internal combustion engine with the intake air compressor operating at the compressor boost control command, comprising maintaining exhaust pressure of the internal combustion engine at the predetermined exhaust pressure limit.

2. The method of claim 1, wherein said intake air compressor is included in a variable-geometry turbocharger (VGT) and determining said second compressor boost signal comprises employing an inverse VGT model in feed-forward operation configured in accordance with the following relationship:

$$VGT = F^{-1}\left(P_r, \frac{\dot{m}_{ex}\sqrt{RT_{ex}}}{P_{ex}}\right)$$

wherein VGT is a modeled VGT position signal,
$P_{ex}$ is exhaust gas pressure,
$T_{ex}$ is exhaust gas temperature,
R is ideal gas constant, $$P_r = \frac{P_{st}}{P_{ex}}$$

is the pressure ratio across a turbine of the variable-geometry turbocharger,
$P_{st}$ is a turbine outlet pressure, and
$\dot{m}_{ex}$ is exhaust mass flowrate.

3. The method of claim 2, wherein the exhaust mass flowrate $\dot{m}_{ex}$ includes compensation for dynamic transport delay.

4. The method of claim 3, wherein the compensation for dynamic transport delay is determined in accordance with the following relationship:

$$\dot{m}_{ex} = \frac{1-\tau_2 s}{1+\tau_2 s}\dot{m}_f + \frac{1-(\tau_1+\tau_2)s}{1+(\tau_1+\tau_2)s}\dot{m}_a$$

wherein $\tau_1$ is air flow transportation delay,
$\tau_2$ is combustion process delay,
$\tau_1+\tau_2$ is mass airflow delay to turbine inlet,
$\dot{m}_f$ is mass fuel flow,
$\dot{m}_a$ is mass air flow.

5. The method of claim 2, wherein determining said second compressor boost signal comprises a feedback loop including a signal correction to said modeled VGT position signal based on PID processing of the deviation of engine exhaust pressure from said predetermined exhaust pressure limit.

6. The method of claim 5, wherein PID processing is suspended when engine exhaust pressure does not exceed said predetermined exhaust pressure limit.

7. The method of claim 1, wherein said intake air compressor comprises a variable-geometry turbocharger (VGT) and determining said second compressor boost signal comprises employing an inverse VGT model in feed-forward operation configured in accordance with the following relationship:

$$VGT = \Omega^{-1}\left(P_r, \frac{\dot{m}_{ex}\sqrt{RT_{ex}}}{P_{ex}f_1(P_r)}\right)$$

wherein VGT is a modeled VGT position signal,
$P_{ex}$ is exhaust gas pressure,
$T_{ex}$ is exhaust gas temperature,
R is ideal gas constant, $$P_r = \frac{P_{st}}{P_{ex}}$$

is the pressure ratio across a turbine of the variable-geometry turbocharger,
$P_{st}$ is a turbine outlet pressure,
$\dot{m}_{ex}$ is exhaust mass flowrate, and $$f_1 = \begin{cases} \sqrt{\frac{2\gamma}{\gamma-1}\left(P_r^{\frac{2}{m}} - P_r^{\frac{m+1}{m}}\right)} & PR_c < P_{st}(\text{subsonic}) \\ \left(\frac{2}{m+1}\right)^{\frac{1}{(m-1)}}\sqrt{\frac{2\gamma}{\gamma-1}\frac{m-1}{m+1}} & P_{st} \le PR_c(\text{choked}), m = f(VGT) \end{cases}$$

wherein $\gamma$ is a specific heat ratio of the gas, and
m is a parameter which is a function of the modeled limit-based compressor boost signal.

8. The method of claim 1, wherein said compressor boost limit comprises said second compressor boost signal when engine exhaust pressure exceeds said predetermined exhaust pressure limit.

9. The method of claim 1, wherein said compressor boost limit comprises said maximum boost setting when engine exhaust pressure does not exceed said predetermined exhaust pressure limit.

10. Method for limiting intake boost pressure in an internal combustion engine including an intake air compressor, comprising
within a control module;
providing a compressor boost signal;
determining an exhaust based compressor boost limit as a function of a predetermined exhaust pressure limit;
when engine exhaust pressure exceeds said predetermined exhaust pressure limit, determining a compressor boost control command as a function of the compressor boost signal, a minimum boost setting, and said exhaust based compressor boost limit;
when engine exhaust pressure does not exceed said predetermined exhaust pressure limit, determining the compressor boost control command as a function of the compressor boost signal, said minimum boost setting, and a maximum boost setting;
controlling the intake air compressor to operate at a position that controls flow of intake air to the internal combustion engine in response to the compressor boost control command; and
operating the internal combustion engine with the intake air compressor operating at the compressor boost control command, comprising maintaining exhaust pressure of the internal combustion engine at the predetermined exhaust pressure limit.

11. The method of claim 10, wherein said intake air compressor is included in a variable-geometry turbocharger (VGT) and determining said exhaust based compressor boost limit comprises employing an inverse VGT model in feed-forward operation configured in accordance with the following relationship:

$$VGT = F^{-1}\left(P_r, \frac{\dot{m}_{ex}\sqrt{RT_{ex}}}{P_{ex}}\right)$$

wherein VGT is a modeled VGT position signal,
$P_{ex}$ is exhaust gas pressure,
$T_{ex}$ is exhaust gas temperature,
R is ideal gas constant, $$P_r = \frac{P_{st}}{P_{ex}}$$

is the pressure ratio across a turbine of the variable-geometry turbocharger,
$P_{st}$ is a turbine outlet pressure, and
$\dot{m}_{ex}$ is exhaust mass flowrate.

12. The method of claim 11, wherein determining said exhaust based compressor boost limit comprises a feedback loop including a signal correction to said modeled VGT position signal based on PID processing of the deviation of engine exhaust pressure from said predetermined exhaust pressure limit.

13. The method of claim 10, wherein said intake air compressor comprises a variable-geometry turbocharger (VGT) and determining said second compressor boost signal comprises employing an inverse VGT model in feed-forward operation configured in accordance with the following relationship:

$$VGT = \Omega^{-1}\left(P_r, \frac{\dot{m}_{ex}\sqrt{RT_{ex}}}{P_{ex}f_1(P_r)}\right)$$

wherein VGT is a modeled VGT position signal,
$P_{ex}$ is exhaust gas pressure,
$T_{ex}$ is exhaust gas temperature,
R is ideal gas constant, $$P_r = \frac{P_{st}}{P_{ex}}$$

is the pressure ratio across a turbine of the variable-geometry turbocharger,
$P_{st}$ is a turbine outlet pressure,
$\dot{m}_{ex}$ is exhaust mass flowrate, and $$f_1 = \begin{cases} \sqrt{\frac{2\gamma}{\gamma-1}\left(P_r^{\frac{2}{m}} - P_r^{\frac{m+1}{m}}\right)} & PR_c < P_{st}(\text{subsonic}) \\ \left(\frac{2}{m+1}\right)^{\frac{1}{(m-1)}}\sqrt{\frac{2\gamma}{\gamma-1}\frac{m-1}{m+1}} & P_{st} \leq PR_c(\text{choked}), m = f(VGT) \end{cases}$$

wherein $\gamma$ is a specific heat ratio of the gas, and
m is a parameter which is a function of the modeled limit-based compressor boost signal.

14. The method of claim 13, wherein determining said exhaust based compressor boost limit comprises a feedback loop including a signal correction to said modeled VGT position signal based on PID processing of the deviation of engine exhaust pressure from said predetermined exhaust pressure limit.

15. Method for controlling intake airflow in an internal combustion engine including a variable-geometry turbocharger (VGT), comprising,
within a control module;
providing a first VGT position signal;
determining a second VGT position signal comprising
employing an inverse VGT model in feed-forward operation to determine a modeled VGT position signal based upon a predetermined exhaust pressure limit, and
employing a feedback loop including a signal correction to said modeled VGT position signal based on PID processing of the deviation of engine exhaust pressure from said predetermined exhaust pressure limit;
determining a VGT position control command based upon the first compressor boost signal and a limit comprising said second compressor boost signal when engine exhaust pressure exceeds said predetermined exhaust pressure limit and a maximum boost setting when engine exhaust pressure does not exceed said predetermined exhaust pressure limit;
controlling variable-geometry turbocharger (VGT) to operate at a position that controls flow of intake air to the internal combustion engine in response to the VGT position control command; and
operating the internal combustion engine with the VGT operating at the VGT position control command, comprising maintaining exhaust pressure of the internal combustion engine at the predetermined exhaust pressure limit.

* * * * *